United States Patent [19]

O'Kane et al.

[11] Patent Number: 4,741,050
[45] Date of Patent: May 3, 1988

[54] WETSUITS

[75] Inventors: Brian O'Kane; Douglas M. Warbrick, both of Torquay, Australia

[73] Assignee: Rip Curl International Pty. Ltd., Victoria, Australia

[21] Appl. No.: 830,525

[22] PCT Filed: Jun. 6, 1985

[86] PCT No.: PCT/AU85/00122
§ 371 Date: Feb. 7, 1986
§ 102(e) Date: Feb. 7, 1986

[87] PCT Pub. No.: WO86/00272
PCT Pub. Date: Jan. 16, 1986

[30] Foreign Application Priority Data

Jun. 21, 1984 [AU] Australia ................. PG5621

[51] Int. Cl.4 .................. A62B 17/00; A41D 27/24
[52] U.S. Cl. .............................. 2/2.1 R; 2/82; 2/275; 112/413
[58] Field of Search .................. 2/2.1 R, 82, 275; 112/413, 434, 269.1; 428/245, 252

[56] References Cited

U.S. PATENT DOCUMENTS

| | | | |
|---|---|---|---|
| 2,115,368 | 4/1938 | Lustbeng | 2/275 X |
| 3,246,337 | 4/1966 | Copeland | 2/275 X |
| 3,246,621 | 4/1966 | Copeland | 2/2.1 R X |
| 3,294,617 | 12/1966 | Way | 2/2.1 R X |
| 3,686,064 | 8/1972 | Bonnet et al. | 2/82 X |

Primary Examiner—Louis K. Rimrodt
Assistant Examiner—Judith L. Olds
Attorney, Agent, or Firm—Larson and Taylor

[57] ABSTRACT

A seam for a wetsuit, involving overlock stitching (23) of the edges (21,22) to be joined and the subsequent introduction of the material (25) having suitable elasticity/recovery properties, such as a polymer, into the well or groove (24) of the seam. Examples of suitable materials are polyurethane, natural rubber latex, silicone and Hypalon. The method of forming the seam involves overlock stitching of the seam for a portion of the wetsuit, positioning the portion on a jig and injecting the material into the well or groove of the seam, and allowing the material to dry or cure before removing the wetsuit portion from the jig.

11 Claims, 3 Drawing Sheets

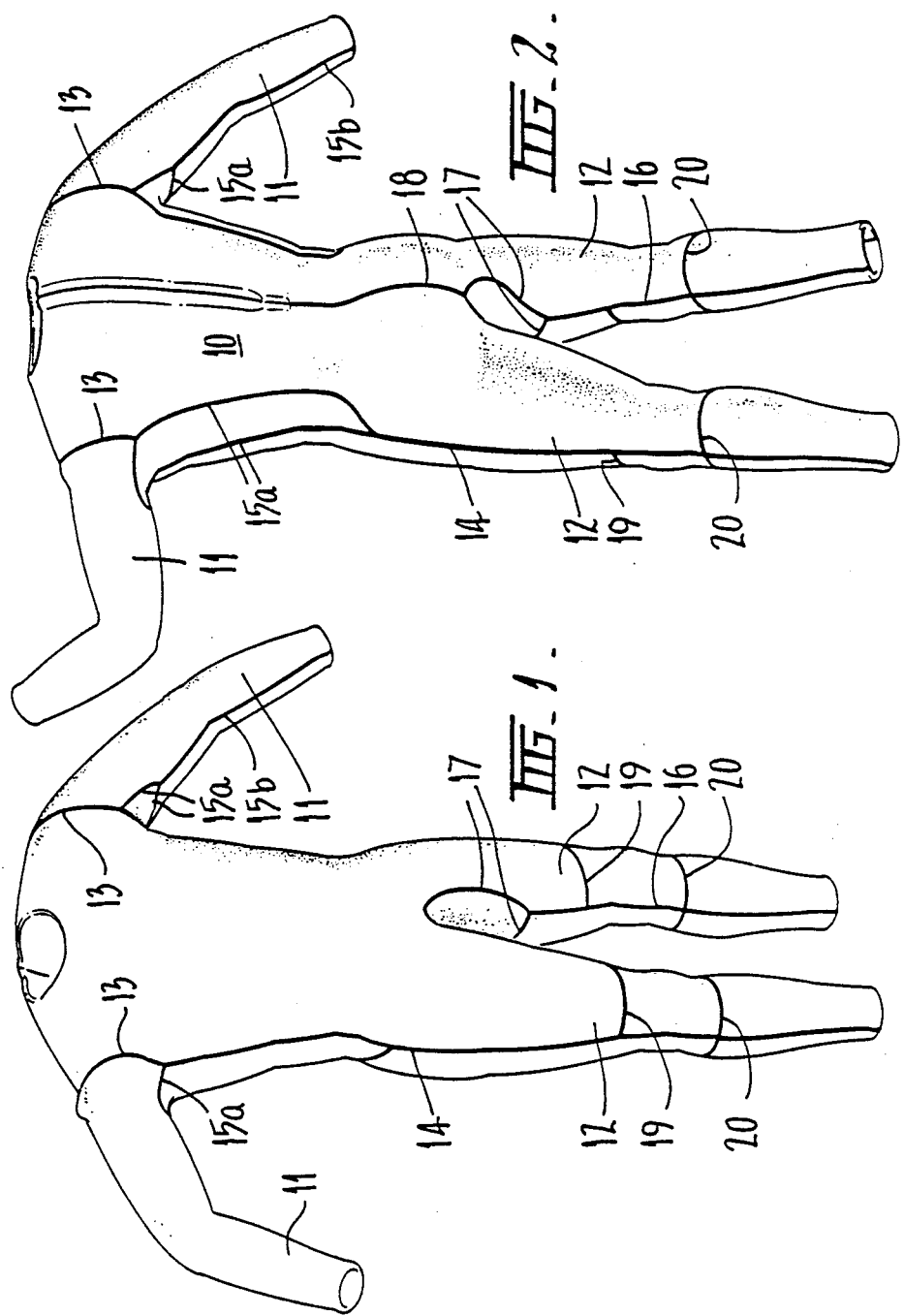

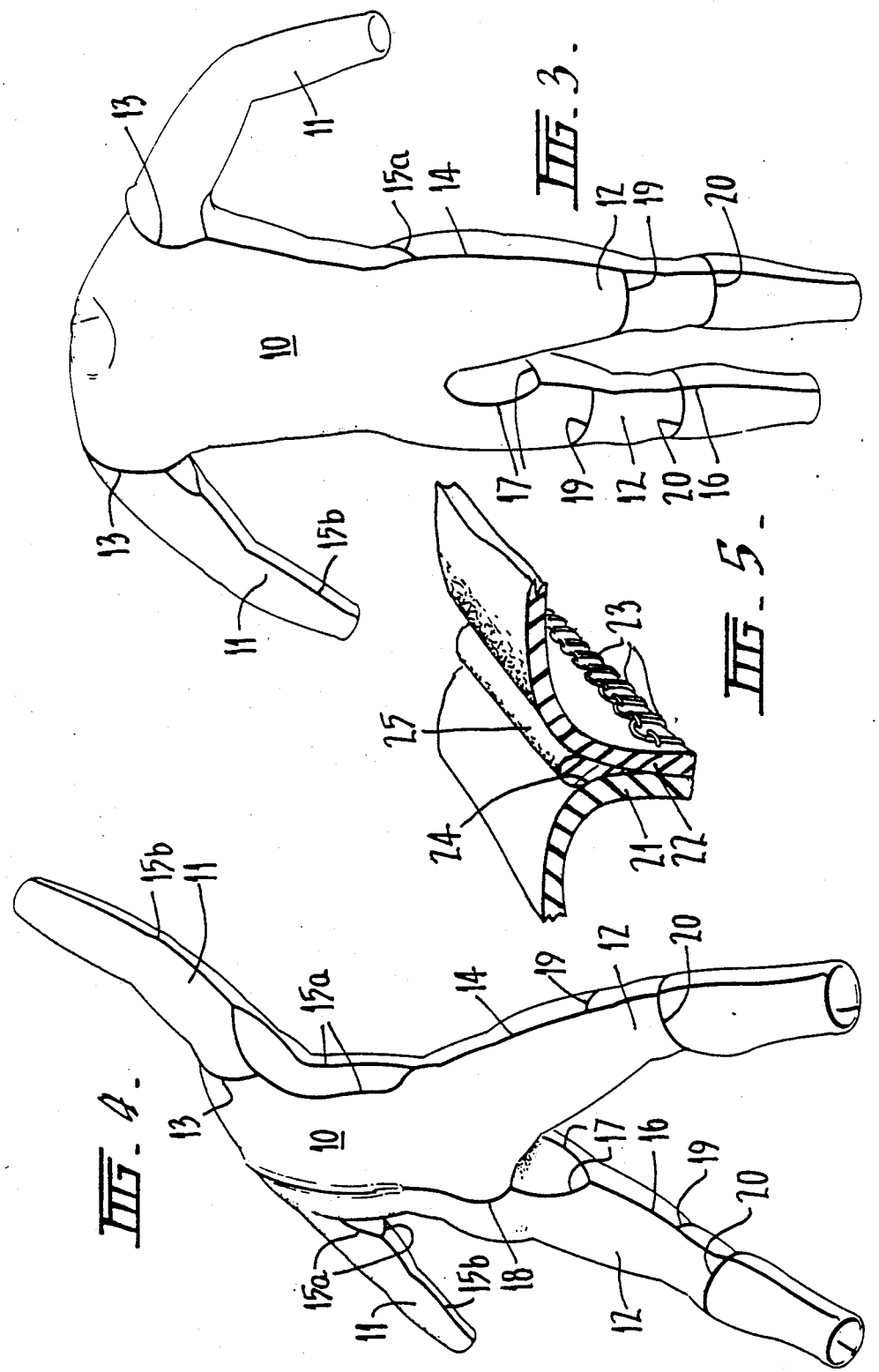

WETSUITS

TECHNICAL FIELD

This invention relates to wetsuits, and more particularly to an overlocked seam construction designed to minimise, if not eliminate, water seepage through the seam to provide a wetsuit particularly suited to cold water conditions. The invention also relates to a method of forming such a seam.

BACKGROUND ART

One traditional method of forming seams in wetsuits formed from closed cell neoprene based materials involves gluing together a butt seam where a rubber-like glue is applied to each of the faces to be butt joined and subsequently butting the faces together and allowing the glue to dry or cure. Although such seams are relatively quick and simple to form, they have been found to have inadequate strength for vigorous active water sport activities such as surfing and wind surfing.

In another method of forming seams, a glued and butted seam of the above type is strengthened by zig-zag stitches across the seam. However, with such a strengthened seam, when the seam is placed under stress during vigorous activity the needle holes become enlarged allowing water to penetrate through the holes to the interior of the suit. In addition the zig-zag stitching is generally unattractive while such a stitching technique is relatively complicated and therefore costly to utilize.

A further advance in the above glued, butted and zig-zag seam involves gluing a flexible tape on opposite sides of the seam, which improves the seam strength and waterproofness, but the addition of the glued tape decreases the flexibility of the seam, whilst also adds a further step to the manufacturing process thus increasing the cost of the procedure.

In one still further proposal, a glued and butted seam, not using zig-zag stitching, has applied to it a thin elastic tape glued manually over the seam or using a hest sensitive tape applied by a hot iron or machine. As there are no stitch holes through the material the seam has good waterproofness. However, seam strength is reduced unless both sides of the joint are taped, but such detracts from the appearance of the wetsuit whilst the cost of production is increased and the flexibility of the seam is also reduced.

In another still further proposal, a glued and butted seam, not utilizing zig-zag stitching, has an elastomeric coating applied over the butt joint on one side and such a seam construction is disclosed in U.S. Pat. No. 3,294,617. However, although the seam is relatively flexible and waterproof, the elastomeric coating, in being on one side only, lacks sufficient strength for the types of activities in question and is still costly to produce, whilst if the coating is applied to both sides the cost is still further increased and the resulting wetsuit is more difficult to don and remove due to the relatively high co-efficient of friction which such coating materials exhibit, and as such the joining technique has found very little commercial application for surfing and wind surfing purposes.

In another still further proposal a glued and butted joint is subsequently blind stitched or cup-seamed on either one or both sides to produce a relatively flexible seam having good waterproofness and seam strength, particularly if sewn on both sides. However, the result is a less attractive seam, whilst production costs are once again high. An advance on this type of seam has utilized a glued down flexible tape, or a heat sensitive tape, on one or both sides of the seam which still further improves the strength and waterproofness of the resulting seam, and although currently used extensively for suits for cold water conditions the production costs are particularly high and flexibility is also reduced.

A still further seam construction which has been proposed, once again involves butting together the edges to be joined and applying an elastic tape along the joint. The tape is stitched into the material and the resulting joint is known as a Mauser joint. Although this technique involves a relatively simple one step process, it is not sufficiently waterproof and thus is not suitable for cold water conditions.

SUMMARY OF THE INVENTION

It is therefore an object of the present invention to provide a seam construction for a wetsuit which is cost effective, including from the ease of manufacture point of view, has sufficient strength and durability whilst also being flexible, and importantly also relatively waterproof.

In accordance with the invention there is provided a seam construction for a wetsuit, which seam is overlock stitched and has introduced into the well or groove of the seam a bead or layer of material having suitable elastic recovery properties.

The invention also envisages a method of forming a seam in a wetsuit, said method comprising overlock stitching the edges to be joined and subsequently introducing into the well or groove of the seam a bead or layer of material having suitable elastic recovery properties.

A seam in accordance with the above invention is relatively, if not completely, waterproof, exhibits excellent flexibility and is less expensive to produce than the various conventional butt jointed, glued and taped and sewn seams discussed above. The inherent strength of overlocked stitching is enhanced by the bed or layer of elastic material. In addition the bead or layer provided on the outside of the seam provides aesthetic appeal by highlighting the overlocked seam shadowline, whilst there is no major difficulties or friction, or "drag", problems when doning or taking off the wetsuit.

BRIEF DESCRIPTION OF THE DRAWINGS

One embodiment of the invention will now be described with reference to the accompanying drawings, in which;

FIGS. 1 to 4 are perspective views form different angles of wetsuit showing the various positions of seams of the type incorporating the present invention; and FIG. 5 is a cross-section through one embodiment of a seam in accordance with the present invention.

DETAILED DESCRIPTION OF THE INVENTION

Figure 6:
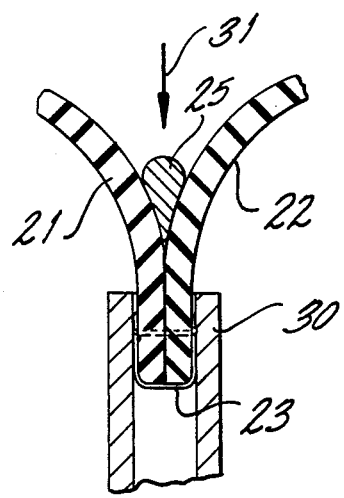
FIG. 6 is a schematic view illustrating a step in a method of the present invention.

Referring to FIGS. 1 to 4 of the drawings, the present invention, although applicable to all styles of wetsuits, is particularly applicable to the type known as a full wetsuit, that is, having a main torso portion 10, and full length arms 11 and legs 12.

Seams 13 attach the arms 11 to the main torso 10 at the shoulder area, and main seams 14 extend down the lower portion of the length of the suit along the outer sides of the legs, with additional seams 15a connecting with the upper sections of the main seam 14 to form underarm gussets which merge with seams 15b extending along the length of the arm. Seams 16 are also formed down the inside leg and merge with additional seams 17 to form a gusset at the crutch of the suit. Other seams include a back seam 18 and series of seams 19 and 20 above and below the knee.

In accordance with the preferred embodiment of the invention, and referring to FIG. 5, portions 21 and 22 of the wetsuit material at the edges to be joined, to form the seams in the wetsuit of FIGS. 1 to 4, are laid side by side as shown and overlock stitched at 23, whereafter as shown schematically in FIG. 6, the section of the suit is positioned over a jig 30 of a size suited to receive the relevant section and with the well or groove 24 formed by the overlock stitched seam facing outwardly. A bead or layer 25 of suitable material, such as a polymer, is then applied to the well or groove using either a squeeze bottle or an air pressure applicator, either one being represented schematically by arrow 31 in FIG. 6. The wetsuit section is then left on the jig 30 for in the order of 20–30 minutes at ambient temperature to allow the polymer to dry sufficiently before the section is removed from the jig.

With the above technique, part of the polymer bead or layer 25 covers the thread of the overlocked stitches 23 and the needle holes thus reducing seepage through the seam due to capillary action, whilst the remainder of the polymer, by virtue of its hydrophobic nature, inhibits water seepage through the seam gap. The bead 25 of hydrophobic polymer bonds strongly to the stitch thread and the synthetic fabric (nylon or polyester) which is laminated to the neoprene sponge of the wetsuit material, and due to its elastic recovery properties the polymer is highly compatible with the neoprene/fabric laminate of the wetsuit material which is normally placed under considerable strain when the wetsuit is being worn.

We have found that several polymers have the necessary hydrophobic and good elastic recovery properties, such as, polyurethane, natural rubber latex, silicone, Hypalon (a trademark for a rubbery material obtained by the chlorination and sulfonation or polyethylenes) or like materials.

In addition, the line formed by the polymer bead or layer also has a decorative effect in accentuating the seam areas.

We claim:

1. A seam construction for a wetsuit, which seam is overlock stitched to form a well or groove on the outside of the wetsuit, with the well or groove of the seam having bonded therein an injected bead of material having elastic recovery properties and rendering the seam substantially waterproof.

2. The seam construction as claimed in claim 1, wherein the material of the said bead is a polymer having hydrophobic properties.

3. A seam construction as claimed in claim 2, wherein the material is polyurethane.

4. A seam construction as claimed in claim 2, wherein the material is natural rubber latex.

5. A seam construction as claimed in claim 2, wherein the material is silicone.

6. A seam construction as claimed in claim 2, wherein the material is Hypalon, which is a rubbery material obtained by the chlorination and sulfonation of polyethylenes.

7. A wetsuit incorporating a seam as claimed in claim 1.

8. A method of forming a seam in a wetsuit, said method comprising overlock stitching the edges to be joined to produce a well or groove on the outside of the wetsuit, and subsequently injecting into the well or groove of the same a bead of material having elastic recovery properties and rendering the seam substantially waterpoof.

9. A method as claimed in claim 8, including, after overlock stitching of said seam, placing said wetsuit on a jig, and then injecting said material into the well or groove and then leaving the wetsuit on the jig until said material has dried or cured.

10. A seam formed according to the method of claim 8.

11. A wetsuit incorporating a seam formed according to the method of claim 8.

* * * * *